United States Patent [19]

Hein et al.

[11] 4,229,306
[45] Oct. 21, 1980

[54] HOUSING FOR SINGLE-USE FILTER UNITS

[75] Inventors: Wolfgang Hein; Klaus Cosack, both of Dassel, Fed. Rep. of Germany

[73] Assignee: Carl Schleicher & Schüll GmbH & Co. KG, Einbeck, Fed. Rep. of Germany

[21] Appl. No.: 14,365

[22] Filed: Feb. 23, 1979

[30] Foreign Application Priority Data

Mar. 3, 1978 [DE] Fed. Rep. of Germany ....... 2809321

[51] Int. Cl.³ .............................................. B01D 25/04
[52] U.S. Cl. .................................... 210/446; 210/451; 210/455; 210/462; 210/927
[58] Field of Search ............... 210/435, 445, 446, 448, 210/449, 451, 452, 453, 454, 455, 456, 459, 460, 462, 247, DIG. 23; 55/492, 501, 504, 516

[56] References Cited
U.S. PATENT DOCUMENTS 2,784,843  3/1957  Braunlich ............................ 210/247
4,113,627  9/1978  Leason ................................. 210/446

Primary Examiner—Frank Sever
Attorney, Agent, or Firm—Burns, Doane, Swecker & Mathis

[57] ABSTRACT

A housing for single-use pressure filtration units comprises upper and lower parts. A filter element is to be clamped between the housing parts. The upper housing part, preferably molded in one piece of synthetic material, includes a plurality of radial ribs which hold the filter element down, and a baffle disk supported solely by the ribs. The disk is spaced beneath the axial inlet duct to prevent direct impingement of axially incoming pressurized fluid against the filter element. Only some of the ribs support the disk, the remaining ribs terminating short of the disk to promote uniform radial distribution of fluid deflected by the disk. Radially inner ends of the disk support ribs are inclined downwardly and inwardly and act in funnel-like fashion on the inflowing fluid.

10 Claims, 2 Drawing Figures

HOUSING FOR SINGLE-USE FILTER UNITS

BACKGROUND AND OBJECTS OF THE INVENTION

The invention concerns a single-use filter housing of the type to be used in pressure filtration systems.

Single use filter units, including a single-use filter element contained within a single-use housing form part of the present state of art and are being employed in various fields of application, for example for medical and pharmaceutical purposes, in connection with environmental protection services and in laboratory operations. Such units are being used primarily in cases where relatively small quantities of fluid at a highest degree of purity are needed. These filtering units, which include the housing, are termed "single-use" because they are used only one time before being discarded.

The single-use filter units with which the present invention is concerned are designed for a pressure filtration operation. The fluid to be filtered, either a liquid or a gas, is introduced under pressure onto the filter surface. The pressure usually ranges from 1 to 10 bar. These pressures are necessary in order to attain a sufficiently speedy filtration because the filter elements being utilized are normally diaphragm filters with a relatively low filtering speed. As a rule, it can be stated that the higher the filtration pressure, the shorter will be the time required for the filtering of a specific volume.

The single-use filters of the type being discussed here must be mass-produced at very low cost since they will be discarded after a single-use. Inexpensive material and economy of construction will therefore limit the magnitude of filtration pressure to which such single-use filters can be subjected. The upper pressure limits for the filter housings, usually comprising welded-together upper and lower parts, formed of synthetic material, are approximately 15 bar. However, single-use filter elements which are being used at the present time can be subjected only to filtration pressures in the neighborhood of 1 bar because the filter will tear under the influence of higher pressures of flow at which the medium to be filtered is being forced into the filter housing by way of a central charging duct.

A similar problem exists in the case of the large pressure filtration units made of steel which are costly, consist of many components and are designed for a use extending over several years. The problem was solved in the case of such units by the use of a special structural component which holds the filter down at the filter support, the so-called back-pressure screen. This back-pressure screen can be attached to the lower or the upper portion of the filter housing in such manner that it can be easily disengaged and removed. The attachment is accomplished in that manner that the downward facing internal surface of the upper housing part remains unobstructed. A so-called baffle plate is bolted by way of spacers to this freely available internal surface of the upper part. This baffle plate deflects radially the flow entering the filter housing axially under pressure, thus preventing the entering flow from striking the filter directly and vertically.

Such structural design which is rather costly cannot be used in the case of the single-use filters which are mass-produced and discarded after one single application. There are known single-use filters of the type being discussed which are constructed without a back-pressure screen and baffle plate where the filter diaphragm is welded peripherally between the two housing halves. It was found, however, in the case of single-use filters so constructed that due to the lack of a back-pressure screen, even minor filtration pressure fluctuations will cause the filter diaphragm to rise from the filter support so that it will have the tendency to tear. Furthermore, such filters will not allow a filtering in reverse direction, for example when drawing in an injection solution into a syringe from a storage container.

One type of single-use filter housing represents a significant improvement in comparison with the known arrangements. The bottom side of the upper housing part is equipped with radially extending ribs, the lower edges of which being located, after assembly of the single use filter, either directly at or at least immediately adjacent the upper filter surface, which normally constitutes the diaphragm surface. These ribs, which form one single piece with the upper part of the filter housing will hold the filter down at the filter support, thus essentially performing the function of the backpressure screen employed in the case of the large pressure filtration units. The ribs usually number from eight to twelve. This specific design and arrangement of the holding-down ribs prevents, however, the customary placement of the baffle plate above the backpressure screen. The known single-use filter housings, representing the present state of art, are provided therefore with a charging duct which is freely open directly above the filter element surface. As a result thereof, and as explained above, the standard single-use filter housings can be loaded by only 10% of the desired filtration pressure, even though the desired pressure could be absorbed by even the most inexpensively manufactured housing.

It is, therefore, an object of the invention to improve the standard single-use filter housings so that it will become possible, without any appreciable increase in production costs, to manufacture single-use filter units that can be subjected to the maximum pressure able to be sustained by the housing and which will also operate in a reliable manner during operations involving the drawing-in of the fluid.

It is another object of the present invention to provide a single-use filter housing whose upper part is of one-piece molded construction and comprises filter hold-down ribs and a baffle disk which prevents the direct impingement of vertically entering fluid against the filter element.

SUMMARY OF THE INVENTION

These objects are solved by the present invention which involves a single-use filter housing comprising upper and lower housing parts. The upper housing part includes a central charging duct, a plurality of radial ribs and a baffle disk supported solely by at least some of the ribs. The disk is arranged beneath the charging duct in spaced relation therefrom and is sized to completely cover the profile of the charging duct as viewed in plan. The disk includes a bottom side arranged substantially coplanar with lower edges of the ribs. The thickness of the disk is no greater than two-third of the maximum height of the ribs.

Preferably, the filter housing is produced from a synthetic material by injection molding, with the ribs and the baffle disk being included in the mold and thus forming one single unit.

BRIEF DESCRIPTION OF DRAWINGS

The advantages of the present invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
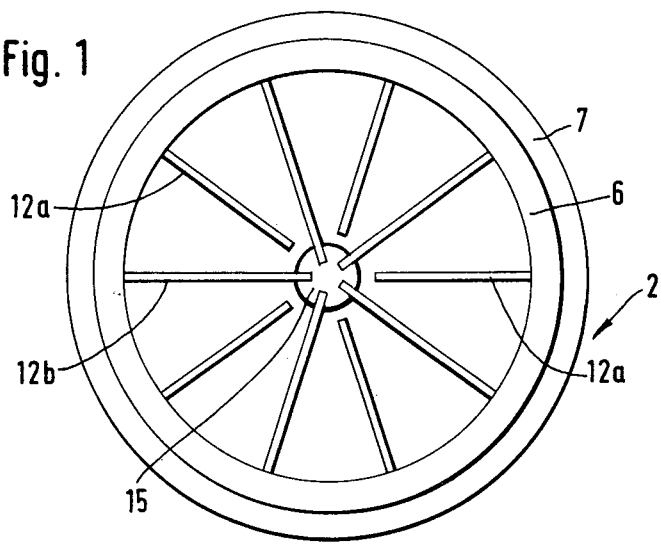
FIG. 1 depicts the upper part of a filter housing as seen from beflow, that is, from the filter side.
Figure 2:
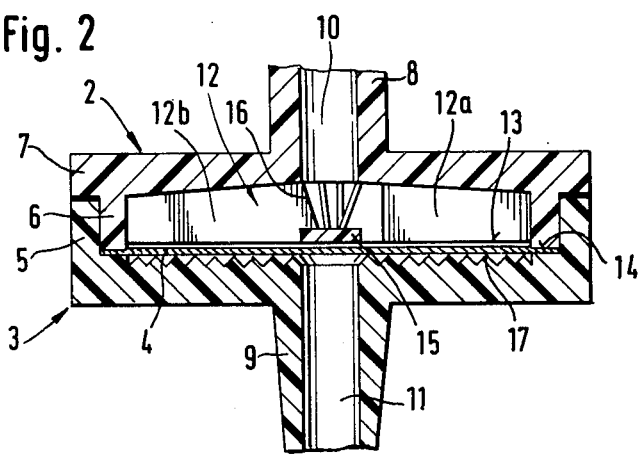
FIG. 2 is a longitudinal sectional view of a single-use filter with the upper part of the filter housing, illustrated in FIG. 1, shown in a diagrammatically simplified manner and not to scale.

The single-use filter 1 comprises, as illustrated in FIG. 2, primarily three parts, namely an upper housing part 2, a lower housing part 3 and a filter element 4. The filter element 4 can be formed by a paper filter, a diaphragm filter, a filter package composed of several layers or some other filter that is known per se. The lower housing part 3 is bowl-shaped with an upward-pointing annular rim 5. The upper part 2 has the form of a substantially flat plate with a downward-pointing, circular inner rim 6 (see FIG. 1) which engages internally, in telescopic fashion, the upward-pointing rim 5 of the lower housing part 3. The radially projecting edge 7 of the upper housing part 2 fits generally with its underside to the outer wall of the upward-pointing rim 5 of the lower housing part 3. The downward-pointing rim 6 of the upper housing part 2 extends axially to such an extent that the filter element 4 will be firmly held and fixed in place between the housing parts 2 and 3 which such parts are welded together. Naturally, the two housing parts can also be interconnected by some method other than welding, for example by fluing or bolting.

The upper housing part 2 contains a centrally and axially aligned charging fitting 8, and the lower housing 3 contains a discharge fitting 9, also aligned centrally and co-axially to the charging fitting 8. Within the charging fitting 8 there is formed a charging duct 10 for feeding under pressure a medium to be filtered. Within the discharge fitting 9 there is formed a discharge duct 11 for the discharge of the filtrate. The fittings 8 and 9 are designed in standard manner for coupling purposes so that they will be compatible, for example, with the "Luer" system.

Beginning at the circular rim 6, there extends at the bottom side of the upper housing part 2 radially toward the inner opening of the charging duct 10 ten ribs 12 which are arranged at equal angular distances from each other. The lower edges 13 of the ribs 12 are at a slightly higher level than the bottom side 14 of the circular rim 6 so that during the welding of the upper housing part onto the lower housing part, the lower edges 13 of the ribs 12 will not be pressed into the filter element and will, at most, touch the filter surface only lightly upon assembly of the filter housing.

A baffle disk 15 is positioned directly beneath the opening of the charging duct 10. The diameter of the baffle disk 15 is practically identical with, or slightly larger than, the diameter of the charging duct 10. The baffle disk completely covers the profile of the duct 10 when the latter is projected downwardly, i.e., when viewed in plan. The bottom side of the baffle disk 15 is located exactly within the plane defined by the lower edges 13 of the ribs 12. The thickness of the baffle disk 15 amounts to no more than two-third and preferably amounts to approximately one-third of the maximum height of the ribs 12 within the region of the baffle disk 15, thus ensuring a sufficiently free flow between the upper side of the baffle disk 15 and the lower surface of the upper housing part 2 by the medium forced into the filter housing.

The baffle disk 15 is supported and held in place solely by the ribs 12. In the case of the species of the invention illustrated by the two figures, the upper housing part 2 and the lower housing part 3 are made from synthetic material, such as plastic, with the baffle disk 15 molded to the ribs 12b, forming one single piece therewith. The ribs 12 are, in turn, molded to, and form one piece with the with the remaining cover portion of the upper housing part 2 so that the entire upper housing part 2 forms a single integral injection-molded unit which can be produced by a single molding cycle.

FIG. 1 shows that the baffle disk 15 is held in place by, or is molded to, every other rib 12b. In this manner, it becomes possible to provide the needed, relatively great number of ribs (ten ribs in case of the species illustrated) without impeding or damming-up in radial direction the outflow of the medium flow. This is achieved by terminating the non-support ribs 12a, which do not support the baffle disk 15, at a distance from the outer rim of the baffle disk 15. The extent of the distance corresponds approximately to the thickness of the rib proper.

FIGS. 1 and 2 show that the ribs 12b which support the baffle disk 15 do not end at the outer rim of the baffle disk 15 but rather overlap the upper side of the baffle disk 15 with their front ends 16 which slope toward the center of the upper side of the baffle disk 15. A particularly stable and rigid hold of the baffle disk 15 is attained as a result of this design. At the same time, there is accomplished thereby a particularly efficient distribution of the inflow in radial direction over the entire surface of the filter 4. The sloping front ends 16 are acting in this case, so to speak, as flow-guiding vanes.

The embodiment of single-use filters illustrated in FIGS. 1 and 2 is usually designed for a filter element 4 having a diameter ranging from 10 to 50 mm. However, this filter housing can, in principle, also be readily used for smaller or greater diameters, with the number of ribs 12 being increased or decreased in accordance with the diameter of the filter element 4. It is only necessary and important that these ribs 12 hold the filter 4 down at the filter support 17 in a sufficiently uniform manner.

Accordingly, the baffle disk is not arranged above the filter-retaining element as in multi-use filter units but rather within a common plane with such retaining element. Moreover, the disk is not supported at the upper part of the filter housing but rather directly at the retaining element. The baffle disk will thus hold-down and support the portion of the filter located directly above the outlet duct and will therefore perform additionally a holding-down function, with the result that the single-use filter housing of the present invention can also be utilized in reverse direction, for example when drawing-in an injection solution into a syringe from a storage container. The filter housing makes it possible to produce single-use filters from only three component parts, namely the upper part, the lower part and the filter element, with the production costs being essentially identical with the costs for known standard filter units, but with performance characteristics which are comparable with those of large pressure filtration units which are costly and consist of many components. Bursting pressure tests have shown that in the case of single-use filters constructed in accordance with the state of art the portion of the filter diaphragm located beneath the charging inlet was always pierced as a result of the pressure. In the case of single-use filters accommodated within filter housings designed in accordance with the present invention, however, it was found that before any piercing of the filter element could occur, the housing itself would burst as the result of the pressure, usually at the welding seam. The bursting pressures applied to the single-use filters designed in accordance with the state of art were below 2 bar in magnitude, but always greater than 10 bar when applied to the single-use filters accommodated in filter housing, designed in accordance with the present invention.

Because the baffle disk is not supported by all ribs arranged within the housing but only by a certain number of ribs, preferably every other rib, with the non-support ribs terminating at a distance from the outer rim of the baffle disk, a radially outward flow of the medium to be filtered is promoted. Thus, a uniform distribution of the medium over the entire available filter surface is assured without there occurring any damming-up.

The front or radially inner ends of the ribs holding the baffle disk protrude into the area below the charging duct profile, which means that they merge into the upper side of the baffle disk, with the front ends designed in such manner that they slope generally toward the center of the upper side of the baffle disk. These sloping front ends thus form, when viewed in the direction of flow, a structure somewhat similar to a funnel with a closed-off base and fenestrated sides. This arrangement results in a mechanically improved support for the baffle disk as well as a better distribution of the medium flow forced into the filter housing.

The single-use filter unit is assembled by a fluid-tight clamping of the filter element, the latter usually in the form of a diaphragm or a multi-layered filter package, between the upper and the lower housing parts, preferably by welding the entire outer rimgs of the upper and the lower parts.

The filter housing is utilized in a standard manner by fitting the charging duct either directly onto a syringe or some other sleeve valve pump, or by attaching it to a feeding line which supplies the fluid to be filtered under pressure.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a single-use filter housing of the type used in pressure filtration operations and comprising first and second housing parts secured together in fluid-tight manner to define a chamber in which a filter element is to be positioned; the second housing part including a central outlet duct for the filtrate; the first housing part including a central charging duct for delivering the medium to be filtered, and a plurality of ribs extending radially inwardly from an outer rim of the first housing part and including edges located at least immediately adjacent the surface of the filter element positioned within the housing; the improvement comprising baffle disk means for diverting the medium radially outwardly in all directions over the surface of the filter element arranged on an axis of the charging duct in spaced relation therefrom, the baffle disk means being supported solely by at least some of said ribs and sized to completely cover the profile of the charging duct as viewed in plan, the baffle disk means including a first side arranged substantially coplanar with said edges of the ribs, said ribs and said baffle disk means being arranged and dimensioned to enable said filter element to resist upstream and downstream piercing, up to pressures which would otherwise burst said housing.

2. A filter housing according to claim 1, wherein the baffle disk means is supported by only some of the ribs, said last-named ribs being spaced apart by equal angular distances.

3. A filter housing according to claim 2, wherein the baffle disk means is supported by alternate ones of the ribs.

4. A filter housing according to claim 3, wherein there are ten of the ribs.

5. A filter housing according to claim 1, wherein the baffle disk means and the ribs comprise a one-piece integrally molded unit.

6. A filter housing according to claim 5, wherein the last-named ribs include radially inner edges which are inclined and inwardly toward a second side of the disk means.

7. A filter housing according to claim 6, wherein the ribs which do not support the disk means terminate radially inwardly at a distance from an outer end of the disk means, the distance being substantially equal to the thickness of the rib.

8. A filter housing according to claim 1, wherein at least some of said ribs include radially inner edges which are inclined and inwardly toward a second side of the disk means.

9. A filter housing according to claim 1, wherein only some of the ribs support the disk means, the remaining ribs terminating radially inwardly at a distance from an outer rim of the disk means, the distance being substantially equal to the thickness of the rib.

10. A filter housing according to claim 1 wherein the thickness of the baffle disk means is no greater than two-thirds of the maximum height of the ribs.

* * * * *